United States Patent [19]

Oishibashi et al.

[11] 4,272,003
[45] Jun. 9, 1981

[54] BUTT WELDING AND BURR SHEARING MACHINE FOR REINFORCE STEEL

[75] Inventors: Hirotsugu Oishibashi; Katsuyoshi Ueyama, both of Musashino; Muneyuki Ohara, Mitaka; Mitsuo Nakamura, Higashikurume; Takayoshi Amano, Fussa, all of Japan

[73] Assignees: Japanese National Railways; Hakusan Seisakusho Co., Ltd., both of Tokyo, Japan

[21] Appl. No.: 51,272

[22] Filed: Jun. 22, 1979

[30] Foreign Application Priority Data

Jul. 3, 1978 [JP] Japan .................................. 53-80763

[51] Int. Cl.³ ............................................. B23K 37/02
[52] U.S. Cl. ................................. 228/13; 228/44.1 R
[58] Field of Search ...................... 228/44.1 R, 44.1 A, 228/44.5, 13; 269/128

[56] References Cited

U.S. PATENT DOCUMENTS

| 1,983,050 | 12/1934 | Sizer | 269/128 |
| 3,790,058 | 2/1974 | Filkorn | 228/13 X |
| 3,847,323 | 11/1974 | Good et al. | 228/13 X |

FOREIGN PATENT DOCUMENTS 706406 3/1954 United Kingdom .............. 228/44.1 R

*Primary Examiner*—Richard B. Lazarus
*Attorney, Agent, or Firm*—Wenderoth, Lind & Ponack

[57] ABSTRACT

A butt welding and burr shearing machine for metal rod, e.g., reinforce steel has opposed relatively slidable clamping devices (8, 9), which has positioning clamp (10) and pivotable clamp lever to clamp the rod by lever action. One of the clamping devices mounts split type shear dies by the positioning clamp and the clamp lever respectively. In the cutting position of the shear dies 21, 22 the rod F2 is not clamped by the clamping device 10 on which the shear dies are mounted.

By a series of simple operations the rods to be jointed are loaded sideways, clamped by rotating clamp lever, and pressure butt welded, and bulge formed by welding process is sheared off. The completed rod is removed sideways.

2 Claims, 5 Drawing Figures

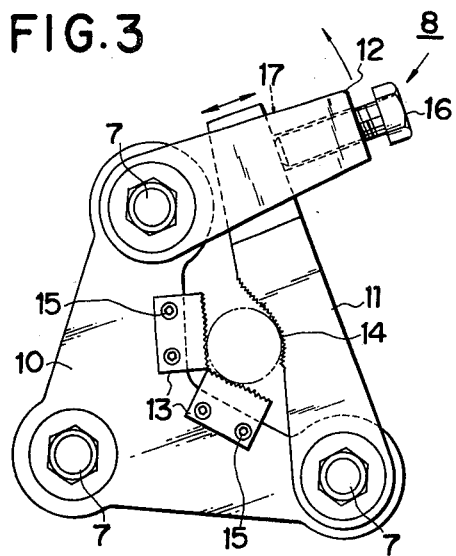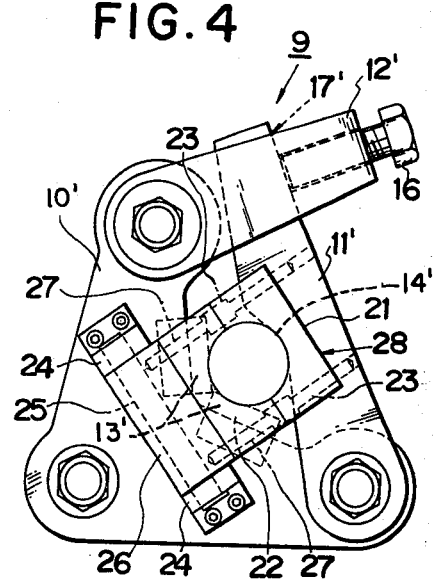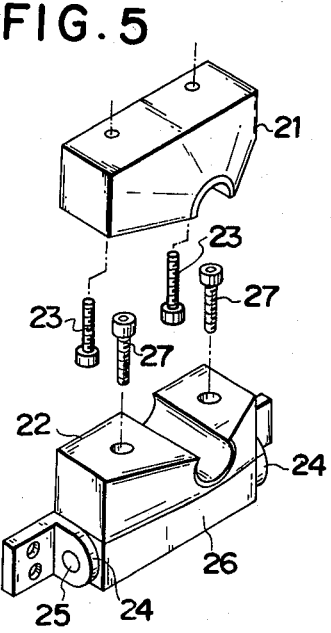

BUTT WELDING AND BURR SHEARING MACHINE FOR REINFORCE STEEL

The present invention relates to a machine for pressure butt welding of metal rods, e.g., reinforcing rods, and also to shear off burrs or bulges which are formed during the welding process.

Gas pressure butt welding is widely used as building site connecting process for reinforcing members of steel. A conventional pressure butt welding machine is shown in FIG. 1, and has two clamps 2 and 3 of steel pipe or split pipe to hold reinforcing rods F1 and F2 therein respectively by means of bolts 4 and 5. One of the clamps is moved by a piston cylinder device 6 relative to the other clamp, and the joint between the rods is heated by a ring shaped gas burner (not shown).

Because the conventional welding machine clamps one side surface of the reinforce steel by direct engagement of the bolts 4 and 5, the force resisting the force of the piston cylinder device is not sufficient, especially for large diameter reinforcing rods. Further, the ends of the bolts may damage surface portions of the reinforcing rods.

The conventional welding machine welds two reinforcing rods to each other and any bridge of the joint is buried in reinforced concrete construction. Thus, stress concentration occurs at the joint during heat stress or vibration of the construction. Further, because the joint portion is bulged, inspection of the joint is difficult. Use of an ultrasonic flow detector has been proposed. However the device is difficult to use effectively at a building site.

The object of the present invention is to eliminate above described problems, and to provide a butt welding and burr shearing machine for metal rods, e.g., reinforcing rods which improves the clamping method and clamping force and simplifies the clamp operation, and also shears off any bulge or burr which is formed during the pressure welding process.

According to the present invention, a butt welding and burr shearing machine for metal rods, e.g., reinforcing rods, has a left clamping device and a right clamping device which are supported by a plurality of stays in opposed relation, at least one of the clamping devices being slidable along the stays; each of said clamping devices has a positioning clamp which is supported by said stays, a clamp lever pivotably supported at one end of the positioning clamp to clamp a rod between the clamp lever and the positioning clamp, and a clamp lock lever which is pivotably supported at the other end of the positioning clamp and has a tightening bolt which urges the free end of the clamp lever by a lever action; said stays are secured by a piston cylinder device which urges one of the clamping devices toward or away from the other, and one of the clamping devices supports a pair of shear dies by means of said positioning clamp and said clamp lever respectively.

The claimed machine performs pressure butt welding and buldge removing by a series of continuous simple operations. The rods are loaded and unloaded sideways. The machine can be effectively operated at a building site.

One way of carrying out the invention is described in detail below with reference to the drawings which illustrate only one specific embodiment, and in which:

FIG. 3 is an end view of the left clamping device of the machine shown in FIG. 2;

FIG. 4 is an end view of the right clamping device of the machine shown in FIG. 2; and FIG. 5 an exploded perspective view of the burr shearing device of the machine shown in FIG. 2.

The figures show a butt welding and burr shearing machine which has a left clamping device 8 fixedly supported by three stays 7, a right clamping device 9 which is slidably supported on the stays 7, a burr shearing device supported on the right clamping device 9, and a piston cylinder device 18 which urges the right clamping device 9 toward and away from the left clamping device 8. The welding heat source can be a gas ring burner, not shown.

Figure 1:
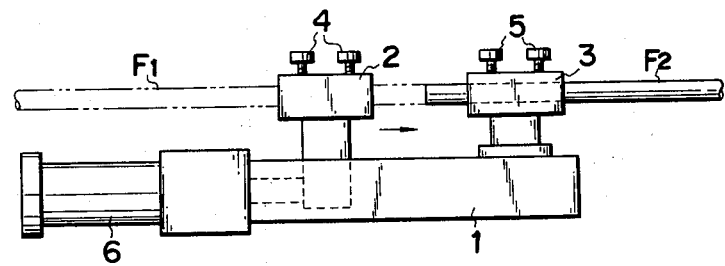
FIG. 1 is a plan view of a conventional pressure butt welding machine.
Figure 2:
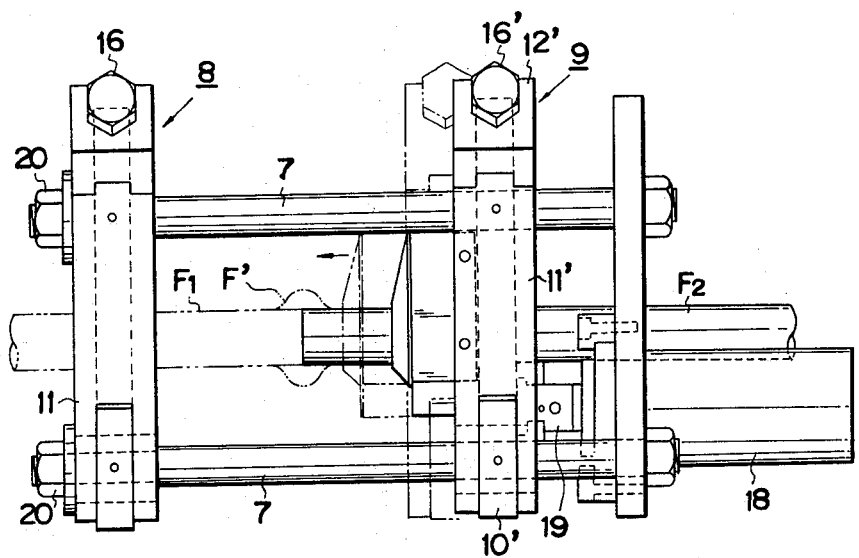
FIG. 2 is a front view of a butt welding and burr shearing machine for reinforcing rods in accordance with the invention.

The left clamping device 8 is shown in FIG. 3 and has a generally L shaped positioning clamp 10 which is supported by the three stays 7, a clamp lever 11 which is pivotably supported for movement about one stay 7 at the free end of the one leg of the positioning clamp 10, and a clamp lock lever 12 which is pivotably supported for movement around another stay 7 at the free end of the other leg of the positioning clamp 10. On the inside edge of the positioning clamp 10 are two clamp pawl members 13 secured to clamp 10 by bolts 15. The clamp lever 11 has a clamp portion 14 which is opposed to the clamp pawl members 13. By rotating the clamp lever 11 counter clockwise as shown in FIG. 3, the clamp pawl members 13 of the positioning clamp 10 and the clamp portion 14 of the clamp lever 11 cooperate with each other to clamp a metal rod, e.g., reinforcing rod F1 as shown in FIG. 2. The clamp lever 11 may have a clamp pawl member instead of the clamp portion 14.

The clamp lock lever 12 has a generally rectangular opening 17 therein to receive the free end of the clamp lever 11 and a bolt 16 is threaded into the free end of the clamp lock lever 12. The bolt 16 urges the back surface of the clamp lever 11 toward the clamp 10 when the clamp lever 11 is received in the opening 17 of the clamp lock lever 12, to produce a large clamping force on the reinforcing rod F1 which is clamped between th clamp pawl members 13 and the clamping portion 14. The clamping force is increased by the lever action of the clamp lever 11 and holds the reinforcing rod F1 tightly.

The right clamping device 9 shown in FIG. 4 has a generally similar construction to the above described left clamping device 8, and has a generally L shaped positioning clamp 10' which is slidably supported on the stays 7, a clamp lever 11' which is pivotably and slidably supported on one of the stays 7, and a clamp lock lever 12' which is pivotably and slidably supported on another of the stays 7. The positioning clamp 10' has also two clamp pawl members 13', and the clamp lever 11' has also a clamp portion 14'. The clamp pawl members 13' and the clamp portion 14' cooperate to clamp a reinforcing steel F2. The clamp lock lever 12' has a generally rectangular opening 17' to receive free end of the clamp lever 11' and a bolt 16' threaded in top end of the clamp lock lever 12' to urge the back surface of the clamp lever 11' in the opening 17' toward the clamp 10' to produce a large clamping force by the pawls 13 and the clamp portion 14 on the reinforcing rod F2.

The positioning clamp 10' of the right clamping device 9 is connected with a ram 19 of the piston cylinder device 18. Cylinder of the piston cylinder device 18 is secured to a frame, not shown, which rigidly supports the stays 7 by a suitable bracket means. When the piston cylinder device 18 is actuated, the right clamping device 9 is urged toward the left clamping device 8 which is secured on the stay 7 or may be supported by stop means 20 against further displacement. Thus, the opposed ends of the reinforcing rods F1 and F2 are pressed together by a strong force.

The burr shearing device is mounted on one of the left and right clamping devices 8 and 9. In the embodiment shown the burr shearing device is mounted on the right clamping device 9. The burr shearing device has a pair of shear dies 21 and 22 which enclose whole periphery of the reinforcing rod when the shear dies 21 and 22 are connected. The shear die 21 is mounted in a recess 28 on the side surface of the clamp lever 11' and secured to the clamp lever 11' by bolts 23. The other shear die 22 mounted on a base 26 by bolts 27, as shown in FIG. 5. Both ends of the base 26 have stub shafts 25 which are rotatably supported by brackets 24. The brackets 24 are secured to the side surface of the positioning clamp 10'. Thus, the shear die 22 and the base 26 rotates relative to the positioning clamp 10' between the operative position and the inoperative position. The shear die 22 may be mounted on the positioning clamp 10' so as to be radially slidable and may be clamped at the operative position. The shear dies 21 and 22 may be mounted on another plate which is secured with the stays 7 between the clamping devices 8 and 9, and at least one of the dies 21 and 22 may be radially slidably mounted on the plate.

Operation of the butt welding and burr shearing machine shown in the drawings will be described hereinafter. Two metal rods, e.g., reinforcing rods to be connected are secured in the clamping devices 8 and 9. The rods F1 and F2 are placed in opposed relation in the machine in contact with the clamp pawl members 13 and 13' of the positioning clamps 10 and 10' of the left and right clamping devices 8 and 9, respectively. At first, the right clamping device 9 is withdrawn to right and position shown in FIG. 2 by the ram 19 of the piston cylinder device 18. Because the clamp levers 11 and 11' of the left and right clamping devices 8 and 9 are opened at this time, the rods F1 and F2 can be placed in the clamps easily by moving the rods laterally. Then the clamp levers 11 and 11' are rotated, and the clamp lock levers 12 and 12' are rotated to receive the free ends of the clamp levers 11 and 11' in the openings 17 and 17' of the levers 12 and 12'. Then the bolts 16 and 16' are tightened to clamp the rods F1 and F2 by the clamp pawl members 13 and 13' of the positioning clamps 10 and 10' and the clamp portions 14 and 14' of the clamp levers 11 and 11'.

The rods F1 and F2 are clamped tightly by lever action of the clamp levers 11 and 11'. Further, the contact surfaces of the pawl members 13 and 13' and the clamp portions 14 and 14' can be selected as desired to provide a tight clamping force and not injure the rod surfaces. The clamping and release by the clamp levers 11 and 11' and the clamp lock levers 12 and 12' are easily carried out, and the rods F1 and F2 are loaded and unloaded sideways. Thus connection of long rods is easily performed.

After the rods F1 and F2 are thus clamped, the piston cylinder device 18 is actuated to urge the right clamping device 9 leftwards by the ram 19. Thus, the end surfaces of the rods F1 and F2 are brought into contact each other. The gas ring burner not shown, is placed in an operative position to generally encircle the joint between the rods F1 and F2. The burner is actuated while the piston cylinder device 18 is operated. Thus, the joint portion of the rods F1 and F2 is pressure butt welded. The joint portion of the rods bulges and forms a burr F' shown in FIG. 2.

The shear die 22 of the burr shearing device is rotated to the inoperative position before the start of the clamping and welding process. After the butt welding step, the bolt 16' of the right clamping device 9 is loosened and the piston cylinder device 18 withdraws the right clamping device 9 as far as necessary. Then, the shear die 22 is rotated to the operative position, and the bolt 16' is tightened to bring the surfaces of the shear dies 21 and 22 against each other. In this position of the dies, the rod F2 is not clamped by the clamping device on which the shear dies are mounted. Then the piston cylinder device 18 is again actuated to extend the ram 19. The right clamping device 9 slides along the rod F2 and the burr or bulge F' is sheared off by the shear dies 21 and 22.

After the burr shearing operation, the bolts 16 and 16' are loosened and the clamp lock levers 12 and 12' and the clamp levers 11 and 11' of the left and right clamping devices 8 and 9 are rotated to the open positions. The formed and burr sheared rod is unloaded sideways.

The right clamping device 9 is withdrawn to the right end position and the shear die 22 is rotated to the inoperative position. Then, new rods are loaded sideways and the above described process is repeated.

As described in detail, metal rods, e.g., reinforcing rods for concrete construction can be very easily and rapidly formed and smoothed by a series of simple and continuous operations by the machine according to the invention.

It is well known that vibration of reinforced concrete construction causes stress concentration at bulged joints in reinforcing rods and can produce cracks in the heat affected portion of the rod. By removing the bulged portion by the burr shearing process using the machine, the reliability of reinforced concrete construction is improved.

When the welding process is not effective, cracks in the joint portion can be recognized easily after the burr shearing process by a suitable inspection process, e.g., a color check. Thus, quality control is easier and more reliable than conventional bending or tension testing by sampling inspection.

The machine is compact and light weight, can be conveyed anywhere, and can be operated by an unskilled person.

We claim:

1. A butt welding and burr shearing machine for metal rods, comprising:

a plurality of parallel stays;

a left clamping device and a right clamping device supported by said stays in spaced relation, at least one of said clamping devices being slidable along said stays, each of said clamping devices having a positioning clamp non-rotatably supported on said stays, a clamp lever pivotally supported at one end of said positioning clamp and pivotable between an open position in which a rod can be loaded into said clamping device and a clamping position in which a rod is clamped between said clamp lever and said positioning clamp, and a clamp lock lever pivotably supported at the other end of said positioning clamp, and pivotable between a position in which the free end of said clamping lever is movable toward the other end of said positioning clamp and a closed position in which said clamp lock lever holds the free end of said clamp lever close to the other end of said positioning clamp, said clamp lock lever having a tightening bolt therein engaging the free end of said clamp lever and urging it toward the other end of said positioning clamp;

a piston cylinder device connected to one of said clamping devices for moving said one of the clamping devices toward and away from the other clamping device; and a pair of mating shear dies on one of said clamping devices, one of said dies being on the positioning clamp thereof and the other of said dies being on the clamp lever thereof, one of said dies being movably mounted for movement between an inoperative position in which it is spaced from a rod clamped in the clamping device, and an operating position in which it engages the other die to hold a rod in shearing engagement therebetween and spaces the positioning clamp and clamping lever of the one clamping device sufficiently far apart so that they cannot clamp a rod therebetween.

2. A machine as claimed in claim 1 in which said movably mounted shear die is pivotably mounted on a side surface of the positioning clamp of said one clamping means.

* * * * *